United States Patent
Matsuno et al.

(10) Patent No.: US 7,654,902 B2
(45) Date of Patent: Feb. 2, 2010

(54) USER-NAME SWITCHING METHOD ON NETWORK GAME

(75) Inventors: Yasumi Matsuno, Tokyo (JP); Kazutoyo Maehiro, Tokyo (JP)

(73) Assignee: Kabushiki Kaisha Square Enix, Tokyo (JP)

( * ) Notice: Subject to any disclaimer, the term of this patent is extended or adjusted under 35 U.S.C. 154(b) by 1187 days.

(21) Appl. No.: 10/107,141

(22) Filed: Mar. 28, 2002

(65) Prior Publication Data

US 2002/0160837 A1 Oct. 31, 2002

(30) Foreign Application Priority Data

Apr. 26, 2001 (JP) .............................. 2001-130242
Mar. 26, 2002 (JP) .............................. 2002-086666

(51) Int. Cl.
*A63F 13/00* (2006.01)
(52) U.S. Cl. .......................................... 463/42; 463/40
(58) Field of Classification Search ............. 463/40–42, 463/25

See application file for complete search history.

(56) References Cited

U.S. PATENT DOCUMENTS

| | | | |
|---|---|---|---|
| 5,964,660 | A | 10/1999 | James et al. |
| 6,009,458 | A | 12/1999 | Hawkins et al. |
| 6,106,395 | A | 8/2000 | Bgiis |
| 6,205,478 | B1 | 3/2001 | Sugano et al. |
| 6,640,304 | B2 | 10/2003 | Ginter et al. |
| 6,692,359 | B1 * | 2/2004 | Williams et al. .............. 463/42 |
| 6,712,704 | B2 | 3/2004 | Eliott |
| 6,746,332 | B1 * | 6/2004 | Ing et al. ...................... 463/42 |
| 6,860,808 | B2 | 3/2005 | Levitan |
| 2001/0036865 | A1 * | 11/2001 | Neal, III ....................... 463/42 |
| 2002/0042293 | A1 * | 4/2002 | Ubale et al. ..................... 463/9 |
| 2002/0126846 | A1 * | 9/2002 | Multerer et al. ............. 380/251 |
| 2003/0009549 | A1 | 1/2003 | Machiro |

FOREIGN PATENT DOCUMENTS

| | | |
|---|---|---|
| EP | 949787 | 10/1999 |
| EP | 1078667 | 2/2001 |
| JP | 2000-32033 | 1/2000 |
| JP | 2000-066931 | 3/2000 |

(Continued)

OTHER PUBLICATIONS

The Lost Vikings Game documentation 1996-2004.*

(Continued)

*Primary Examiner*—Peter DungBa Vo
*Assistant Examiner*—Arthur O. Hall
(74) *Attorney, Agent, or Firm*—Greenblum & Bernstein P.L.C.

(57) ABSTRACT

A terminal receives service provided by a server while using any one of a group of user-names stored in the server for each user and while using a character associated with the user-name. When a character currently in use is switched to another character according to a user instruction, the terminal compares a user-name associated with the switched character with a user-name currently in use. When the compared user-name is different from the user-name currently in use, the terminal switches the user-name on the terminal side to a user-name associated with the switched character, and transmits information, indicating the user-name associated with the switched character, to the server.

13 Claims, 7 Drawing Sheets

FOREIGN PATENT DOCUMENTS

| | | |
|---|---|---|
| JP | 2000-353140 | 12/2000 |
| JP | 2001-14254 | 1/2001 |
| WO | 97/22072 | 6/1997 |
| WO | 01/46824 | 6/2001 |

OTHER PUBLICATIONS

Thalshara, Ultima Online: Renaissance, Jun. 8, 2000, http;//pc.ign.com/articles/164/164484pl.html.*

Sweeny, Tim. "Unreal Networking Architecture", Jul. 21, 1999, http://unreal.epicgames.com/Network.htm.*

Taxen, Gustav. Guilds: Communities in Ultima Online, Feb. 2002.*

Simpson, Zachary Booth. The In-game Economics of Ultima Online. Apr. 7, 1999. http;??www.mine-contol.com/zack/uoecon/uoecon.html.*

Ultima Online Renaissance, game manual. released Apr. 30, 2002.*

Electronic Arts, http://support.ea.com/cgi-bin/ea.cfg/php/enduser/std_adp.php?p_faqid=336&p_created=985287375 Cited as evidence, not as art.*

English language Abstract and partial English translation for JP 2000-32033, Jan. 28, 2000.

English language Abstract and partial English translation for JP 2001-14254, Jan. 19, 2001.

English Language Abstract and Partial English Translation of JP 2000-353140.

English Language Abstract of JP 2000-066931.

Tokoton Asoberu Network RPG, Hello! PC, Japan, Soft Bank Kabushiki Kaisha, vol. 6, $6^{th}$ Issue, p. 171, Apr. 8, 1999.

full English language translation of Tokoton Asoberu Network RPG, Hello! PC, Japan, Soft Bank Kabushiki Kaisha, vol. 6, $6^{th}$ issue, p. 171, Apr. 8, 1999.

* cited by examiner

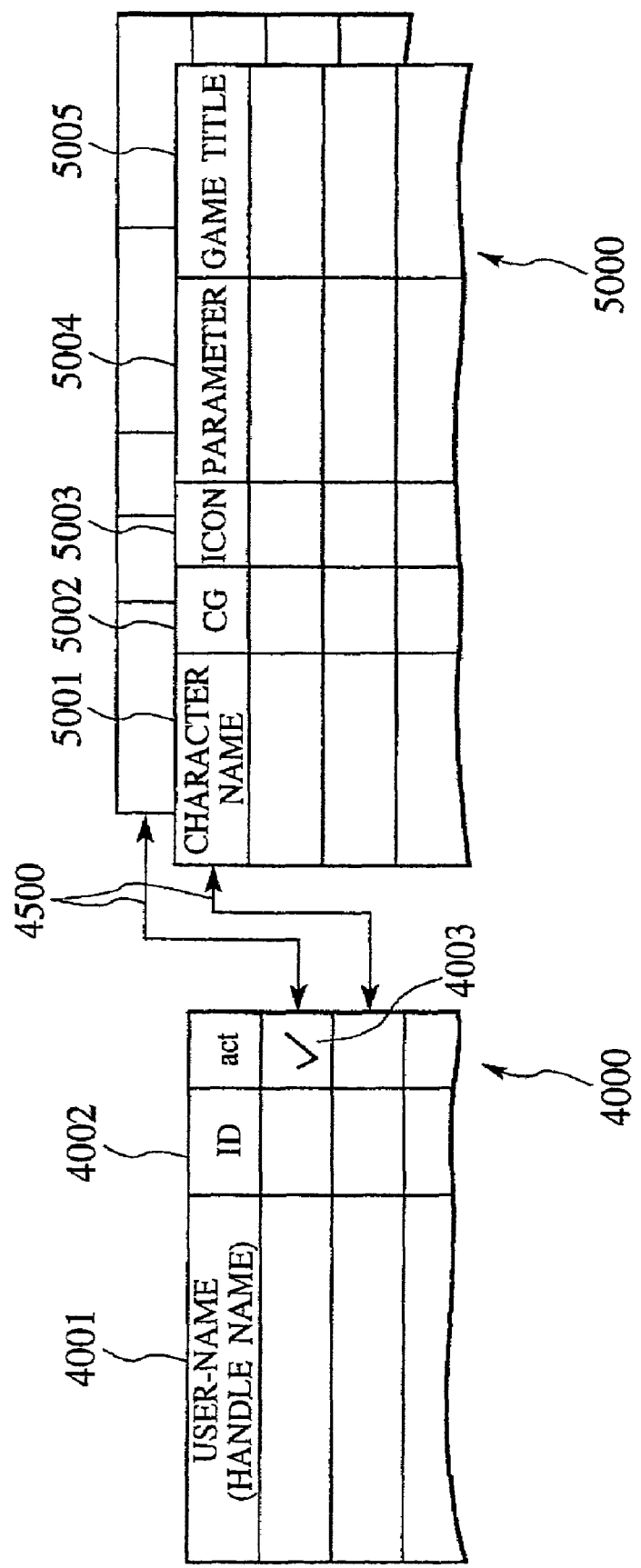

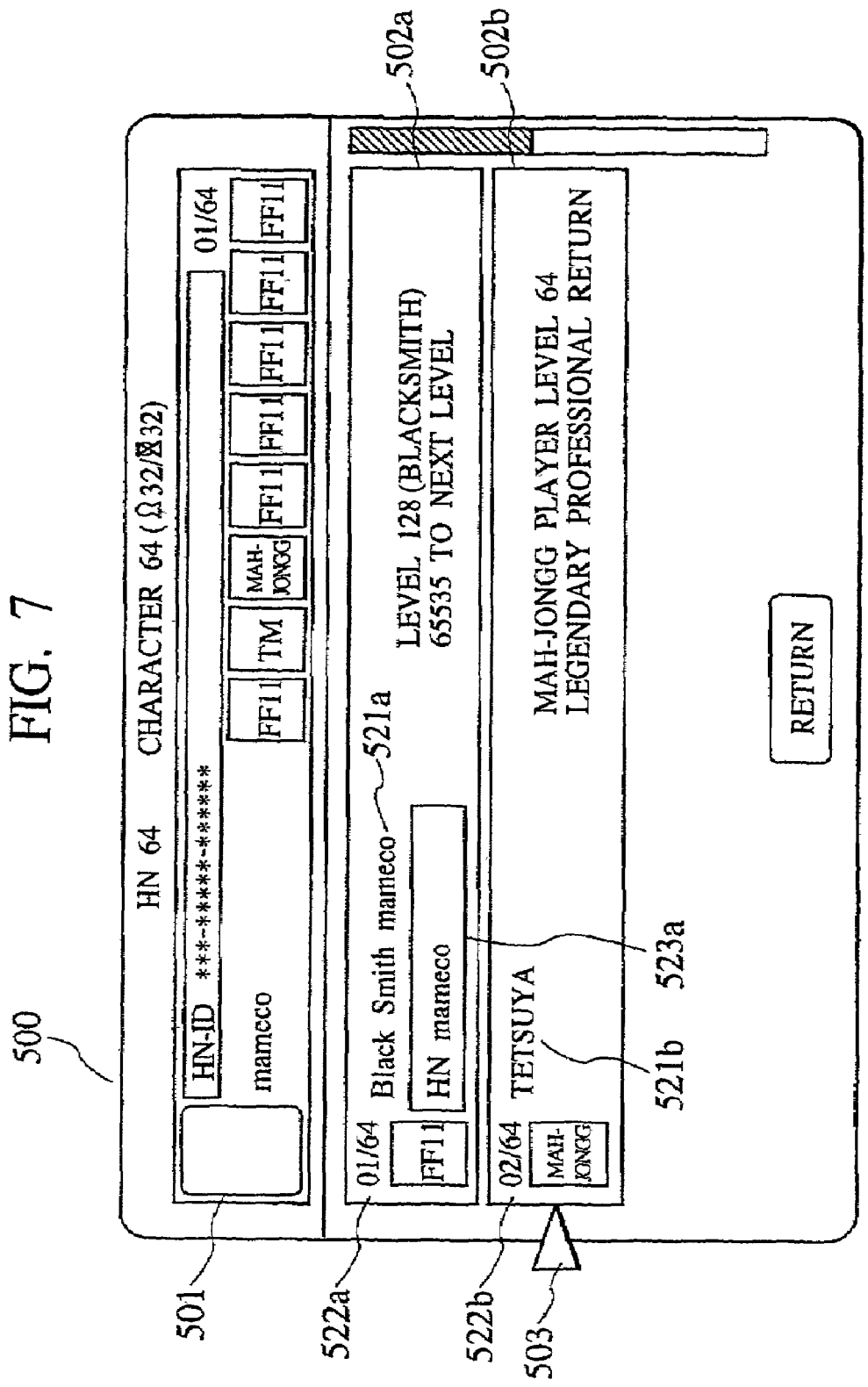

USER-NAME SWITCHING METHOD ON NETWORK GAME

CROSS REFERENCE TO RELATED APPLICATION

The present disclosure relates to subject matter contained in Japanese Patent Application No. 2001-130242, filed on Apr. 26, 2001 and Japanese Patent Application No. 2002-86666, filed on Mar. 26, 2002, the disclosure of which expressly incorporated herein by reference in its entirety.

BACKGROUND OF THE INVENTION

1. Field of the Invention

The present invention relates to a user-name switching method and more specifically to a user-name switching method when a terminal receives service that is provided by a server using multiple user-names and characters associated with the user-names.

2. Description of the Related Art

A video game machine having an Internet connection function installed thereon is connected to a server of an ISP (Internet Service Provider), and this enables the user to receive various kinds of services that the server provides. The user can receive many types of services, such as distribution of game software, battle type games via a network, etc. In order to receive such services, the user generally performs user registration to the ISP in advance. The ISP manages attribute information of the user and collects fees for each service based on information registered by the user.

Information to be registered by the user includes a user-name (handle name) and a password to log into the server together with the user's attributes, such as an address, a name, a telephone number, etc. The user-name does not have to be the same as the user's real name. For example, in the battle type game that the ISP provides, the user can register at least one character appearing on the game and at least one user-name to be associated with the character, and participate in the game anonymously.

When the kinds of games provided by the ISP are diversified, the user sometimes wishes to switch the user-name for each game title and/or use multiple characters for one user-name when participating in the game. However, in the case of being provided a service using multiple user-names from a server, the user-name currently in use must be recognized by both the user terminal and the server. In the case of participating in the game using multiple characters, a match between the user-name and character must be established by both the user terminal and the server. In the case where the user participates in multiple games at the same time, both the user terminal and the server must recognize which user-name is used for each game and which character is used in each game.

SUMMARY OF THE INVENTION

The present invention has been made with consideration given to the aforementioned problems. An object of the present invention is to establish a match between a server side and a terminal side in connection with the user-name when the terminal using multiple user-names receives service provided by the server.

According to a first aspect of the present invention, there is provided a user-name switching method in which a terminal connected to a server switches a user-name when receiving service provided by the server while using any one of a group of user-names stored in the server for each user and while using a character associated with the user-name. The user-name switching method includes switching a character currently in use to another character according to a user instruction and comparing a user-name associated with the switched character with the user-name currently being used to receive the service. The method also includes switching the user-name, which is held by the terminal and is currently used, to the user-name associated with the switched character when the compared user-name is different from the user-name currently in use. The method further includes transmitting information, indicating the user-name associated with the switched character, to the server when the compared user-name is different from the user-name currently in use.

According to a second aspect of the present invention, there is provided a terminal, which receives service provided by a server while using any one of a group of user-names stored in the server for each user and while using a character associated with the user-name. The terminal includes a character switching system that switches the character currently in use to another character according to a user instruction and a comparator that compares a user-name associated with the character switched by the character switching system with the user-name currently being used to receive the service. The terminal also includes a user-name switching system that switches the user-name, which is held by the terminal and is currently used, to a user-name associated with the switched character when the user-name compared by the comparator is different from the user-name currently in use. The terminal further includes a transmitter that transmits information, indicating the user-name associated with the switched character, to the server when the user-name compared by the comparator is different from the user-name currently in use.

According to a third aspect of the present invention, there is provided a terminal, which receives service provided by a server while using any one of a group of user-names stored in the server for each user and while using a character associated with the user-name. The terminal includes storage that stores a program for causing the terminal to switch a character currently in use to another character according to a user instruction, and compare a user-name associated with the switched character with the user-name currently being used to receive the service. The terminal also switches the user-name, which is held by the terminal and is currently used, to a user-name associated with the switched character when the compared user-name is different from the user-name currently in use, and transmits information, indicating the user-name associated with the switched character, to the server when the compared user-name is different from the user-name currently in use. The terminal also includes a processor that executes the program stored in the storage.

According to a fourth aspect of the present invention, there is provided a user-name switching system including a server that stores a group of user-names and a terminal connected to the server. The terminal receives service provided by the server while using any one of a group of user-names stored in the server and while using a character associated with the user-name. The terminal executes a program stored in storage so as to switch the character currently in use to another character according to a user instruction, and compares a user-name associated with the switched character with the user-name currently in use to receive the service. The terminal also switches the user-name, which is held by the terminal and is currently used, to a user-name associated with the switched character, and transmits information, indicating the user-name associated with the switched character, to the server when the compared user-name is different from the user-name currently in use. The server switches the user-name currently in use among the group of user-names stored according to information indicating the user-name sent from the terminal.

The user-name switching method of the present invention can be provided as a program executed by the terminal that is accessible to the server on the network. As a method for providing the program, there, is a method for storing the program in a computer-readable storage medium such as a CD-ROM, a DVD-ROM etc. to distribute it, and a method for superimposing the program on a carrier wave to download it to the terminal from the server.

BRIEF DESCRIPTION OF THE DRAWINGS

FIG. 4A is a view illustrating a list of handle names registered in the video game machine according to one embodiment of the present invention;

FIG. 4B is a view illustrating a list of characters registered in the video game machine according to one embodiment of the present invention;

FIG. 7 is a view illustrating a character list screen page according to one embodiment of the present invention.

DETAILED DESCRIPTION OF THE PREFERRED EMBODIMENT

The following will specifically explain an embodiment of the present invention with reference to the drawings accompanying herewith.

Figure 1:
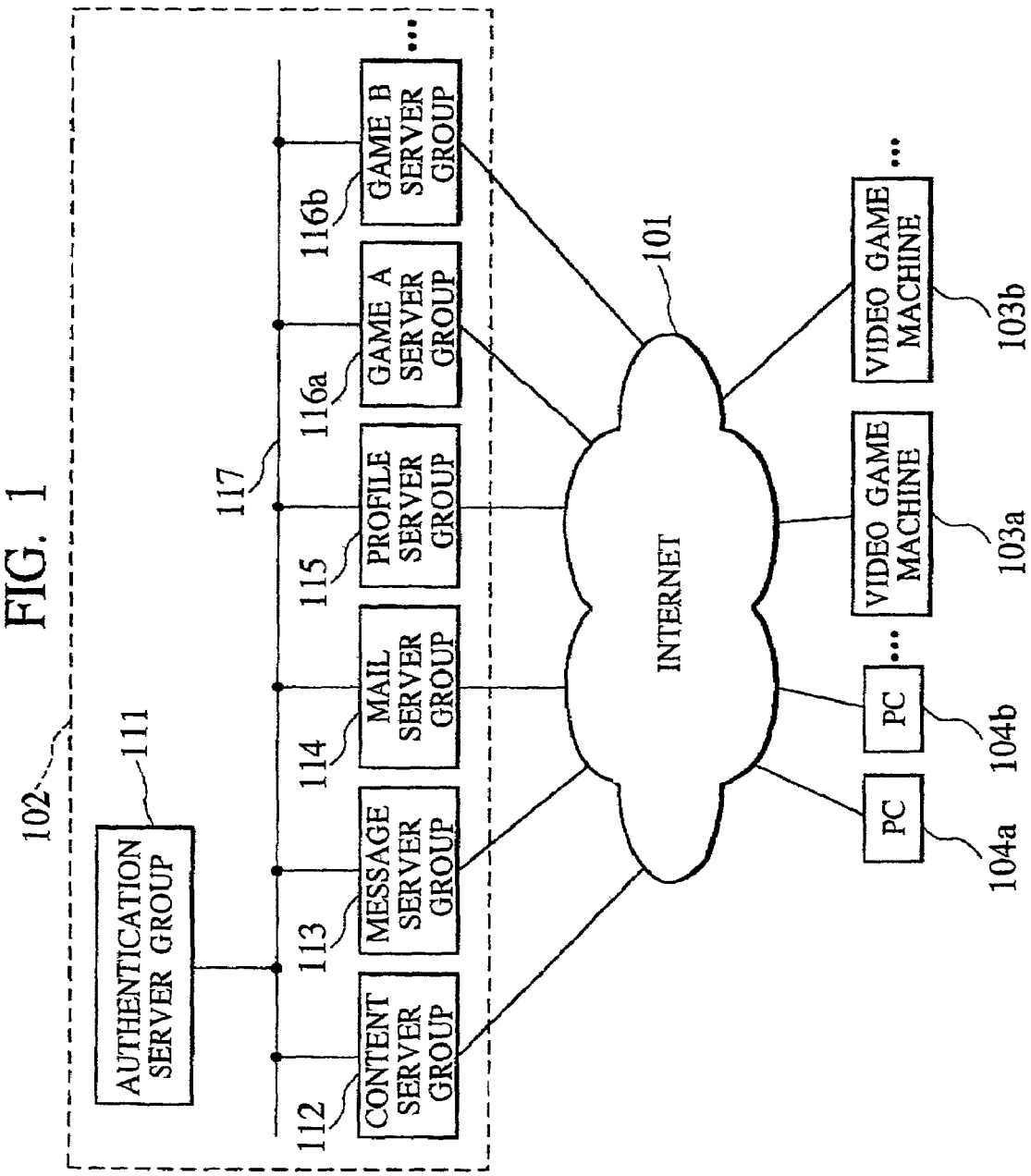
FIG. 1 is a structural view illustrating a network system for providing user-name switching according to one embodiment of the present invention.

FIG. 1 is a structural view illustrating a network system for providing user-name switching according to one embodiment of the present invention. A server 102 of ISP, video game machines 103 (103a, 103b), and general-purpose computers (PCs) 104 (104a, 104b) are connected to the Internet 101.

The server 102 of ISP is composed of multiple server groups including an authentication server group 111, a content server group 112, a message server group 113, a mail server group 114, a profile server 115, and game server groups 116 (116a, 116b). The authentication server group 111 performs account management for user authentication, the content server group 112 provides a browsing service for browsing sound, motion picture, etc., and the message server group 113 provides chat and messaging environments. The mail server group 114 provides e-mail service, the profile server 115 manages a user profile, and the game server groups 116 provide a game environment. These server groups 111 to 116 are connected to one another via LAN 117. The authentication server group 111 is connected to the Internet 101 similar to the other server groups 112 to 116 though this is not illustrated in FIG. 1.

Figure 2A:
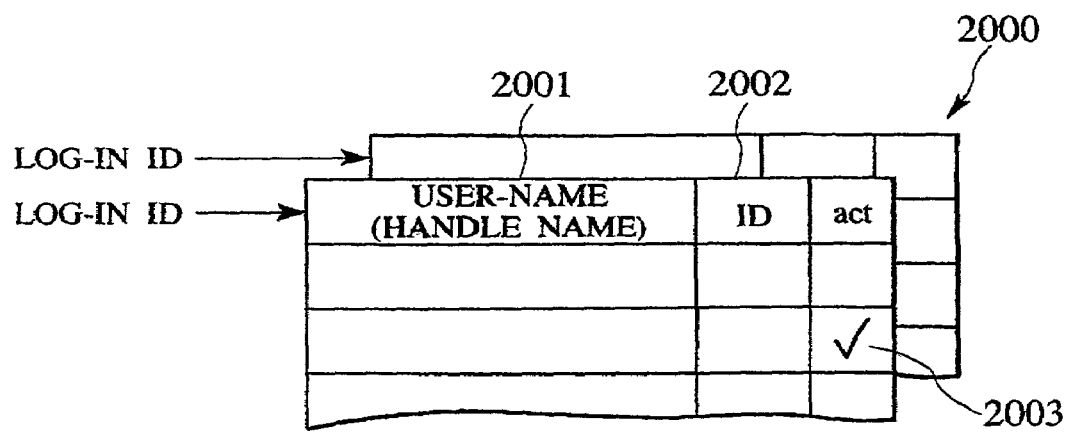
FIG. 2A is a view illustrating a list of handle names registered in a profile server group according to one embodiment of the present invention.

A list of handle names shown in FIG. 2A is registered in the profile server group 115. This list 2000 of handle names is provided to be associated with a log-in ID for each user as illustrated in FIG. 2A. The list 2000 includes one or multiple user-names (referred to as handle names) 2001, which each user uses to receive a service provided by the server 102, and the corresponding ID numbers 2002 of the user-names. Among the handle names registered, a handle name, which is currently used by each user, is referred to as an active handle name, and a flag 2003 representing an active handle name is added in the list 2000, Though this is not illustrated in the figure, a pointer, which corresponds to a pointer 4500 to be described later, is provided between the list 2000 of handle names and a list (corresponding to a list 5000 of characters to be described later) saved from the terminal.

Figure 2B:
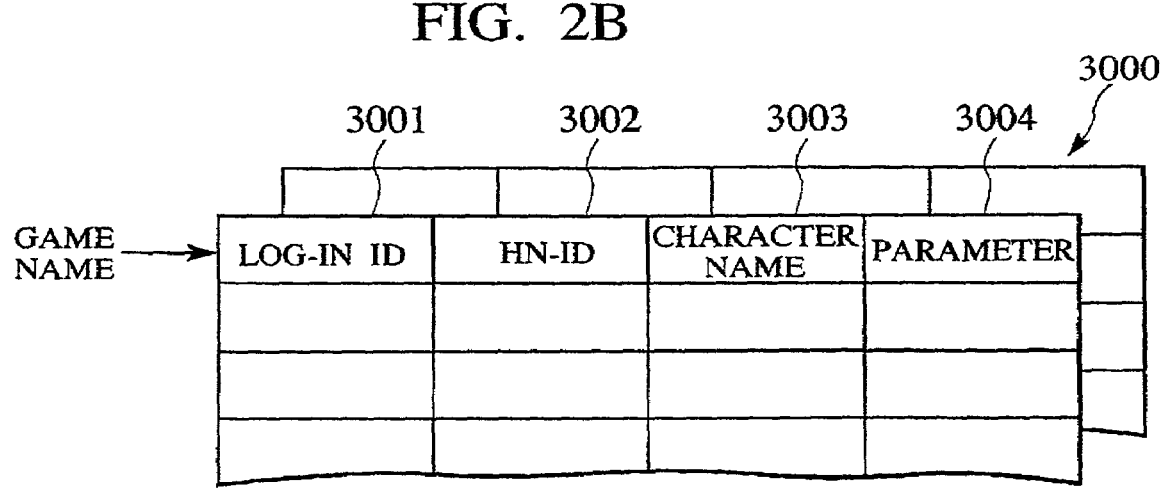
FIG. 2B is a view illustrating a list of participating characters registered in a game server group according to one embodiment of the present invention.

A list of characters currently participating in the game, shown in FIG. 2B, is registered in the game server group 116. This list 3000 of participating characters is provided for each game, which is executable by the game server group 116 as illustrated in FIG. 2B. In each record of the list 3000, a log-in ID 3001 of a user participating in the game, ID number 3002 of the active handle name, a character name 3003 in use and a parameter 3004 of a character are registered therein to be associated with one another.

The user gains access to the authentication server group 111 in the server 102 from the video game machine 103 or general-purpose computer 104 via the Internet 101 and obtains a user authentication. The server 102 transmits a menu screen page to the terminal (PC 104 or video game machine 103) of the user who has obtained authentication. The user selects a desired service from the menu screen page displayed on the terminal, so that the video game machine 103 or general-purpose computer 104 is connected to any one of the server groups 112 to 116 corresponding to the service selected by the user. This makes it possible for the user to receive the service provided from the server 102 at the user's terminal.

Figure 3A:
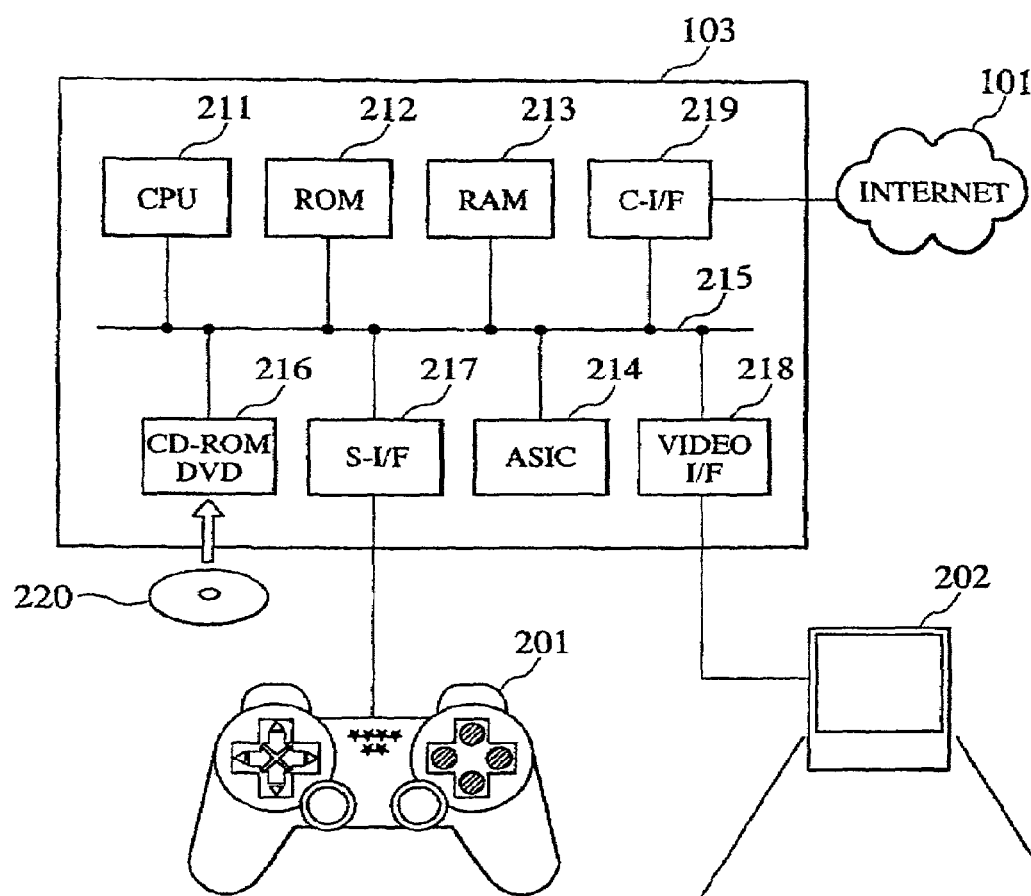
FIG. 3A is a block diagram illustrating a video game machine executing user-name switching according to one embodiment of the present invention.

FIG. 3A is a block diagram illustrating the video game machine providing user-name switching according to one embodiment of the present invention. The video game machine 103 comprises a CPU 211, a ROM 212, a RAM 213, and an application-specific integrated circuit IC (ASIC) 214. The CPU 211 performs the entire control, and the ROM 212 stores a kernel program, etc. The RAM 213 stores a game program, and a program for the user-name switching method relating to the present invention. It is also used as a temporary storage area. The ASIC 214 performs image processing. These structural components 211 to 214 are connected to a bus 215.

Moreover, a CD-ROM/DVD-ROM drive 216, a serial interface 217, a video interface 218, and a communication interface 219 are connected to the bus 215. The CD-ROM/DVD-ROM drive 216 reads a program from a storage medium 220 such as CD-ROM or DVD-ROM having the game program or the program for user-name switching relating to the present invention recorded thereon. The serial interface 217 is connected to a game controller 201. The video interface 218 is connected to a TV monitor 202. The communication interface 219 is connected to the Internet 101.

Figure 3B:
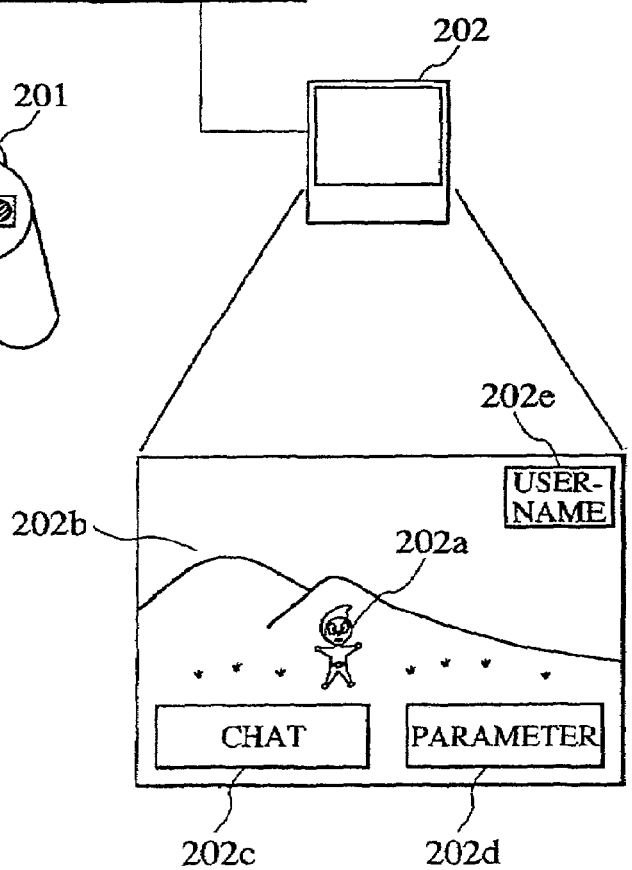
FIG. 3B is a view illustrating an example of a game screen page displayed on a TV monitor according to one embodiment of the present invention.

On the TV monitor 202, a game screen page as illustrated in FIG. 3B is displayed. On this game screen page, a chat window 202c, parameter-data 202d of the character, a user-name 202e currently in use (namely, active handle name), etc., are displayed in addition to a game field 202b including a character 202a.

In order to implement the user-name switching according to one embodiment of the present invention, in the RAM 213, there are stored a list 4000 of handle names shown in FIG. 4A and a list 5000 of characters shown in FIG. 4B. The list 4000 includes one or multiple user-names (handle names) 4001, an ID number 4002 which corresponds with a user-name, and a flag 4003 representing an active handle name, similar to the list 2000 registered in the profile server group 115.

The list 5000 of characters is provided for each user-name. In each record of the list 5000, a character name 5001, which is used when the game is played using the corresponding user-name, graphic data 5002, an icon 5003, various kinds of parameters 5004 relevant to the corresponding character, and a game title 5005 which is performed using the corresponding character are registered and associated with one another. By using each of the game names 5005 registered here, access rights of characters are controlled. The list 4000 of handle names and list 5000 of characters are connected to each other by a two-way pointer 4500 that relates the user-name and the character to each other.

The list 5000 of characters is saved into the profile server group 115 when the terminal logs out from-the server 102. When logging into the server 102, the list 4000 of handle names is restored in accordance with the list 2000 downloaded from the profile server group 115. The list 5000 of characters saved in the profile server group 115 is downloaded to the terminal together with the list 2000 and restored.

The general-purpose computer 104 can be used for applications other than video games. When the computer 104 is used for video games, a graphics board is mounted thereon in place of the ASIC 214, and an input device, which is the same as the game controller 201, is connected to a USB terminal, etc. Thus the computer 104 has the same functions as those of the video game machine 103 shown in FIG. 3A.

The following will explain the operations in the aforementioned network system to implement user-name switching according to one embodiment of the present invention.

Figure 5:
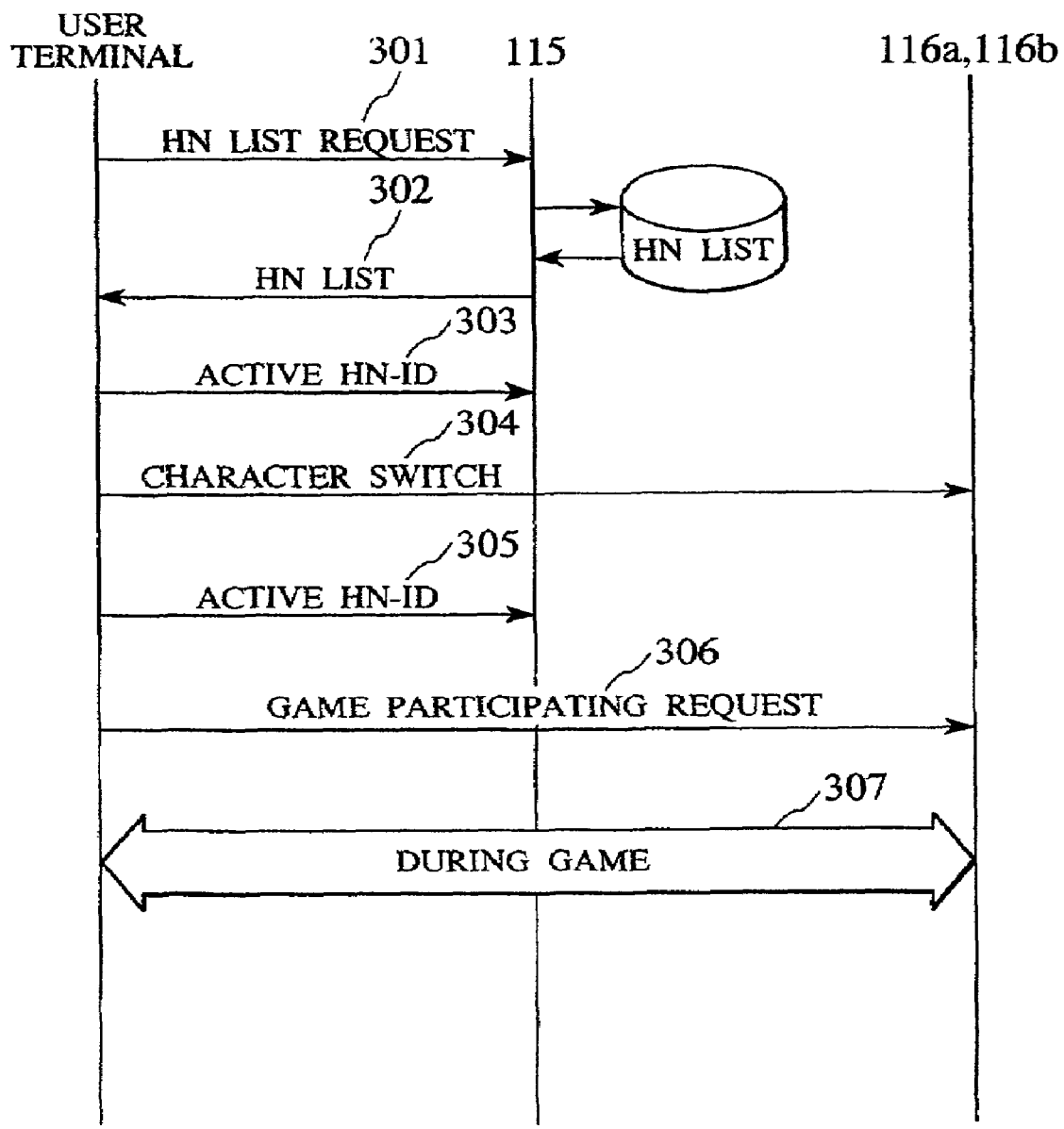
FIG. 5 is a sequence view illustrating a user-name switching method according to one embodiment of the present invention; according to one embodiment of the present invention

FIG. 5 is a sequence view illustrating the user-name switching method according to one embodiment of the present invention. Processing at the terminal, in the case of the video game machine 103, is executed by the CPU 211 according to a program transferred to the RAM 213 from the storage medium 220.

The user gains access to the authentication server group 111 in the server 102 from the user's terminal (video game machine 103 or general-purpose computer 104) inputs a log-in ID and a password from the game controller 201, and the input log-in ID and password are transmitted to the authentication server group 111.

The log-in ID and password are used such that the entirety of the server 102 of ISP performs account management including user authentication. At the time of receiving various kinds of service that the server 102 provides, the user can use one of the user-names (handle names) for identifying the user for each account specified by the log-in ID and the password. The handle names are registered in the list 2000 of the profile server group 115, as illustrated in FIG. 2A.

When obtaining user authentication at the authentication server group 115 based on the transmitted log-in ID and password, the user's terminal can make use of the service provided by the server 102. In the case where the handle names are already registered in he profile server group 115, the terminal transmits a request for downloading the list 2000 of handle names registered in the profile server group 115 (301), and downloads the list 2000 of handle names from the profile server group 115 (302). This restores the list 4000 of handle names on the terminal side.

The number of handle names to be registerable is more than one, and they can be used freely in an arbitrary service. The handle name currently in use is called an active handle name, and the user can optionally designate it from the registered handle names. In the list 2000 of the profile server group 115, the handle name obtained when log-out is recently performed is registered as an active handle name. Moreover, the list 5000 of characters, which was saved, is also downloaded to the terminal from the profile server group 115 and restored in accordance with the download request of the list 2000 of handle names.

The terminal registers the active handle name indicated by the list 2000 downloaded from the profile server group 115 as an active handle name in the list 4000 at the terminal side, and executes a game and the like that are provided by the game server group 116. When an instruction to switch the active handle name is input by the user, the terminal registers the switched handle name as an active handle name in the list 4000, and transmits an ID number of the new active handle name to the profile server group 115. The profile server group 115 switches the active handle name in the list 2000 based on the ID number transmitted (303). If the user does not switch the active handle name, processing in 303 is not carried out.

In the case where the user gains access to the game server groups 116 from the terminal and participates in, for example, a battle type game, the user uses one of the characters registered to be associated with the active handle name to participate in the game. The characters are registered to be associated with the specific game as illustrated in FIG. 4B. The character is an object, which the user operates in a virtual game space.

Before participating in the game, the user can access to the game server groups 116a and 116b to switch the character arbitrarily (304).

When the switch in character is instructed by the user, the terminal determines whether or not the handle name associated with the new character designated by the instruction is different from the active handle name. If the handle name is different from the active handle name, the terminal registers the handle name associated with the switched character as an active handle name in the list 4000, and transmits the ID number of the new handle name to the profile server group 115. The profile server group 115 switches-the active handle name in the list 2000 based on the ID number transmitted (305). If the active handle name is not switched, processing in 305 is not carried out even if the user switches the character.

The user sends a game participation request with the switched character to the game server groups 116 from the terminal (306). At this time, information relating to the switched character is sent to the game server-groups 116, and the list 3000 of participating characters is updated. When the list 3000 is updated and the game server groups 116 accept the game participation request, the user can participate in the game that is provided by the game server groups 116 (307).

The active handle name (user-name used in the game) and/or the character may be switched with arbitrary timing during the game in addition to the aforementioned timing. The switch in active handle name is carried out according to a handle name list screen age shown in FIG. 6. The switch in character (which is accompanied with the switch in handle name in some cases) is carried out in accordance with the handle name list screen page shown in FIG. 6 or a character list screen page shown in FIG. 7. The CPU 211 of the terminal (in the case of the video game machine 103) generates these screen pages according to the lists 4000 and 5000, and causes the TV monitor 202 to display them via the video interface 218.

When the user requests log-out to the server 102 from the terminal, the terminal uploads the list 5000 of characters in response to this request, and causes the profile server group 115 to save it. After the list 5000 of characters is saved, the server 102 accepts the log-out request from the terminal, and executes processing for causing the terminal to log out.

Figure 6:
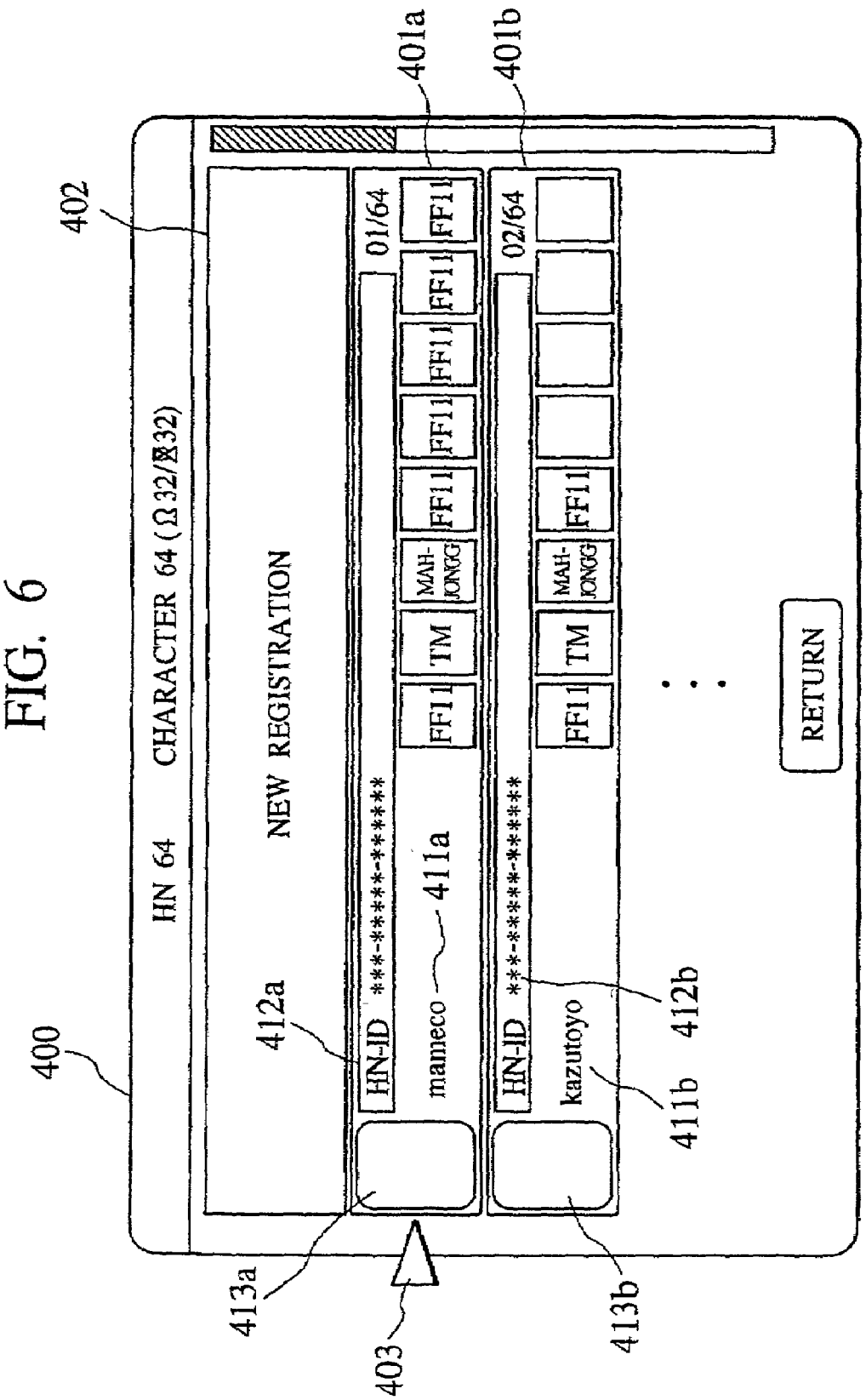
FIG. 6 is a view illustrating a handle name list screen page according to one embodiment of the present invention.

FIG. 6 is a view illustrating the handle name list screen page. The handle name list screen page 400 is a screen page, which is displayed in accordance with the user's request from an initial screen page after user authentication is obtained by the authentication server group 112. It is a screen page for registering, changing or switching the handle name. The handle name list screen page 400 may be displayed with timing (302) when the list 2000 of handle names is sent from the profile server group 115, or displayed with arbitrary timing according to the user's request.

The handle name list screen page 400 is composed of handle name information 401*a*, 401*b* relating to handle names already registered and an input portion 402 for registering or changing a handle name. The handle name information 401*a* and 401*b* include handle names 411*a*, 411*b*, handle name ID numbers 412*a*, 412*b*, and characters 413*a* and 413*b* displayed in icon form.

The active handle name is indicated by a cursor 403, and the user operates the game controller 201 to move the cursor 403 to make it possible to switch the active handle name arbitrarily. The user designates a desired icon of characters 413*a* and 413*b* to make it possible to switch the character used in the game.

In the case of switching the active handle name, the ID number of the switched active handle name is transmitted to the profile server group 115 from the terminal. In the case of switching the character, if the handle name associated with the switched character is different from the active handle name, the ID number of the handle name associated with the switched character is transmitted to the profile server group 115 from the terminal. The terminal recognizes the handle name associated with the switched character based on the lists 4000 and 5000.

FIG. 7 is a view illustrating the character list screen page. The character list screen page 500 is a screen page that is displayed according to the user's request with arbitrary timing from a handle name management screen page. It is a screen page for registering, changing or switching the character. The character list screen page 500 is composed of active handle name information 501 and character information 502*a* and 502*b* relating to characters already registered to be associated with the active handle name. The character information 502*a* and 502*b* includes character names 521*a*, 521*b*, and the character numbers 522*a*, 522*b*, respectively. The information 502*a* includes active handle name 523*a*. The character to be designated is indicated by the cursor 503, and the user operates the game controller 201 to move the cursor 503 to make it possible to arbitrarily switch the character to be used in the game.

The user calls the character list screen page 500 with arbitrary timing during the game to make it possible to switch the character. At this time, when the handle name associated with the switched character is different from the active handle name, the terminal displays the handle name associated with the switched character on active handle name information 501, and transmits ID number of the handle name to the profile server group 115. The terminal also recognizes the handle name associated with the switched character based on the lists 4000 and 5000.

In either case in which the user-name is switched in the aforementioned processing (including the case, which is accompanied with the switch in character), the CPU 211 of the terminal also switches the character name 202*e* on the game screen page (FIG. 3B) immediately in accordance with the updated flag 4003 of the list 4000 indicating the new active handle name.

In the case where an instruction to switch the character is sent from the user, the terminal determines whether or not the handle name (user-name) associated with the switched character is different from the active handle name (namely, user-name currently in use). When the handle name of the switched character is different from the active handle name, the terminal displays the handle name associated with the switched character as an active handle name and sends the ID number of the new active handle name to the profile server group 115. The profile server group 115 also switches the active handle name based on the ID number sent from the terminal. Accordingly, in the case where the terminal receives service provided by the server 102 using the group of user-names and the multiple characters associated with the user-names, there is no case in which a mismatch between the user terminal and the server 102 occurs in connection with the active handle name (namely, user-name currently in use).

In the case where only the active handle name is switched, the ID number of the new handle name is sent to the profile server group 115 from the terminal similarly. For this reason, there is no case in which a mismatch between the user terminal and the server 102 occurs in connection with the active handle name (namely, user-name currently in use).

The switch in character is sent to the game server groups 116 from the terminal. If the switch in active handle name occurs according to the switch in character, the ID number of the new active handle name is sent to the profile server group 115 from the terminal. For this reason, there is no case in which a mismatch between the user terminal and server 102 occurs in connection with the relationship between the user-name and character.

The user-name currently in use (active handle name) is displayed on the handle list screen page 400 and character list screen page 500 to make it possible for the user to recognize it. In addition to this, there is formed an area where the user-name currently in use is displayed on the game screen page displayed on the TV monitor 202. For this reason, the user can recognize the user-name currently in use (active handle name).

Needless to say, the user-name switching according to one embodiment of the present invention can be attained when the game video machine 103 or general-purpose computer 104 reads a program code from the storage medium 220 having a software program code recorded thereon and executes it. As a storage medium for supplying the program code, there can be used, for example, a flexible disc, a hard disc, an optical magnetic disc, a CD-R, a magnetic tape, a nonvolatile memory card, a semiconductor ROM, etc., in addition to a CD-ROM or a DVD-ROM. A signal of program code of the software that implements the user-name switching method may be superimposed on a carrier wave to be transmitted to the terminal from the server 102 (or another server apparatus) via the Internet 101.

In the aforementioned embodiment, the list 5000 of characters associated with the user-name was managed by the terminal side, and the server 102 only saved the list 5000. The list 5000 may be managed by the server 102 (particularly, the profile server group 115). In this case, when the user intends to switch the character, the terminal can gain access to the profile server group 115 to obtain the list 5000, so that the character list screen page 500 etc. can be displayed on the TV monitor 202 according to the obtained list 5000.

In the aforementioned embodiment, the terminal downloaded the list 2000 from the profile server group 115 to establish the match between the server 102 and terminal in connection with the active handle name at the time of log-in. In contrast to this, the terminal may upload the list 4000 to the file server group 115 to establish the match between the server 102 and terminal in connection with the active handle name at the time of log-in. The list 5000 may be also uploaded to the profile server group 115 from the terminal at the time of log-in.

The user-name switching of the present invention is not applied to only the case in which the network game is performed. The present invention can be applied to a network system such that a user gains access to a server apparatus from a terminal and perform chatting with another user while the user moves his/her character to meet the other user's character.

The present invention is not limited to these embodiment, but various variations and modifications may be made without departing from the scope of the present invention set forth in the claims.

What is claimed is:

1. A user-name switching method in which a video game terminal connected to a video game server switches a user-name when receiving a video game service provided by said video game server while using one of a plurality of user-names stored in said video game server for each user and while using a video game character associated with said user-name, said user-name switching method comprising:
   switching the video game character currently in use to another video game character according to a user instruction;
   comparing a user-name associated with the other video game character with the user-name currently being used to receive said video game service, at least two video game characters being associated with the currently used user-name;
   switching the user-name, which is held by said video game terminal and is currently used, to the user-name associated with said other video game character when said user-name associated with the other video game character is different from the user-name currently in use;
   maintaining the currently used user-name when the user-name associated with the other video game character is the same as the currently used user-name; and
   transmitting information, indicating the user-name associated with said other video game character, to said video game server when said other user-name is different from the user-name currently in use.

2. The user-name switching method according to claim 1, further comprising:
   obtaining information, indicating the plurality of user-names of the user of said video game terminal stored in said video game server and the user-name currently in use among said plurality of user-names, from said video game server; and
   holding said obtained information, indicating the plurality of user-names and the user-name currently in use, in said video game terminal.

3. The user-name switching method according to claim 1, wherein said plurality of user-names are stored in said video game server and associated with an identifier used by said video game terminal to log into said video name server.

4. The user-name switching method according to claim 1, further comprising:
   displaying the user-name associated with the other video game character on a display device when said other user-name is different from the user-name currently in use.

5. The user-name switching method according to claim 1 in which information indicating the video game character currently in use is stored in said video game server and associated with the user-name currently in use, said method further comprising:
   transmitting information indicating the other video game character to said video game server when the video game character is switched so as to switch information indicating the video game character, which information is stored in said video game server and is currently in use.

6. A video game terminal, which receives a video game service provided by a video game server while using one of a plurality of user-names stored in said video game server for each user and while using a video game character associated with said user-name, said video game terminal comprising:
   a character switching system that switches the video game character currently in use to another video game character according to a user instruction;
   a comparator that compares a user-name associated with the video game character switched by said character switching system with the user-name currently being used to receive said video game service, at least two video game characters being associated with the currently used user-name;
   a user-name switching system that switches the user-name, which is held by said video game terminal and is currently used, to a user-name associated with said other video game character when said user-name associated with the other video game character is different from the user-name currently in use, and maintains the currently used user-name when the user-name associated with the other video game character is the same as the currently used user-name; and
   a transmitter that transmits information, indicating the user-name associated with said other video game character, to said video game server when said other user-name is different from the user-name currently in use.

7. The video game terminal according to claim 6, wherein said plurality of user-names are stored in said video game server and associated with an identifier that said video game terminal uses to log into said video game server.

8. The video game terminal according to claim 6, further comprising:
   a display controller that causes a display device to display the user-name associated with the other video game character when said other user-name is different from the user-name currently in use.

9. A video game terminal, which receives a video game service provided by a video game server while using one of a plurality of user-names stored in said video game server for each user and while using a video game character associated with said user-name, said video game terminal comprising:
   storage that stores a program for causing the video game terminal to switch the video game character currently in use to another video game character according to a user instruction, compare a user-name associated with the other video game character with the user-name currently being used to receive said video game service, at least two video game characters being associated with the currently used user-name, switch the user-name, which is held by said video game terminal and is currently used, to a user-name associated with said other video game character when said user-name associated with the other video game character is different from the user-name currently in use, maintain the currently used user-name when the user-name associated with the other video game character is the same as the currently used user-name, and transmit information, indicating the user-name associated with said other video game character, to said video game server when said other user-name is different from the user-name currently in use; and a processor that executes the program stored in said storage.

10. A user-name switching system comprising:

a video game server that stores a plurality of user-names; and a video game terminal connected to said video game server, said video game terminal receiving a video game service provided by said video game server while using one of a plurality of user-names stored in said video game server and while using a video game character associated with said user-name, wherein said video game terminal executes a program stored in storage so as to switch the video game character currently in use to another video game character according to a user instruction; compare a user-name associated with the other video game character with the user-name currently being used to receive said video game service, at least two video game characters being associated with the currently used user- name; switch the user-name, which is held by said video game terminal and is currently used, to a user-name associated with said other video game character; maintain the currently used user-name when the user-name associated with the other video game character is the same as the currently used user-name; and transmit information, indicating the user-name associated with said other video game character, to said video game server when said other user-name is different from the user-name currently in use; and said video game server switches the user-name currently in use among the plurality of user-names stored according to information indicating the user-name sent from said video game terminal.

11. A computer-readable storage medium having a program recorded thereon to control a video game terminal connected to a video game server to receive a video game service provided by said video game server while using one a plurality of user-names stored in said video game server for each user and while using a video game character associated with said user-name, said program comprising:

switching the video game character currently in use to another video game character according to a user instruction;

comparing a user-name associated with the other video game character with the user-name currently being used to receive said video game service, at least two video game characters being associated with the currently used user-name;

switching the user-name, which is held by said video game terminal and is currently used, to a user-name associated with said other video game character when said user-name associated with the other video game character is different from the user-name currently in use;

maintaining the currently used user-name when the user-name associated with the other video game character is the same as the currently used user-name; and transmitting information, indicating the user-name associated with said other video game character, to said video game server when said other user-name is different from the user-name currently in use.

12. The program according to claim 11, further comprising:

displaying the user-name associated with the other video game character on a display device when said other user-name is different from the user-name currently in use.

13. A program, the code of which is converted into a signal and superimposed on a carrier wave, and which controls a video game terminal connected to a video game server to receive a video game service provided by said video game server while using one of a plurality of user-names stored in said video game server for each user and while using a video game character associated with said user-name, said program comprising:

switching the video game character currently in use to another video game character according to a user instruction;

comparing a user-name associated with the other video game character with the user-name currently being used to receive said video game service, at least two video game characters being associated with the currently used user-name;

switching the user-name, which is held by said video game terminal and is currently used, to a user-name associated with said other video game character when said user-name associated with the other video game character is different from the user-name currently in use;

maintaining the currently used user-name when the user-name associated with the other video game character is the same as the currently used user-name; and transmitting information, indicating the user-name associated with said other video game character, to said video game server when said other user-name is different from the user-name currently in use.

* * * * *